Jan. 10, 1950 H. G. NIXON 2,494,404
TRAILER
Filed April 30, 1947 2 Sheets-Sheet 1

INVENTOR.
Harold G. Nixon.
BY W. B. Harpman
ATTORNEY.

Jan. 10, 1950 H. G. NIXON 2,494,404
TRAILER
Filed April 30, 1947 2 Sheets-Sheet 2
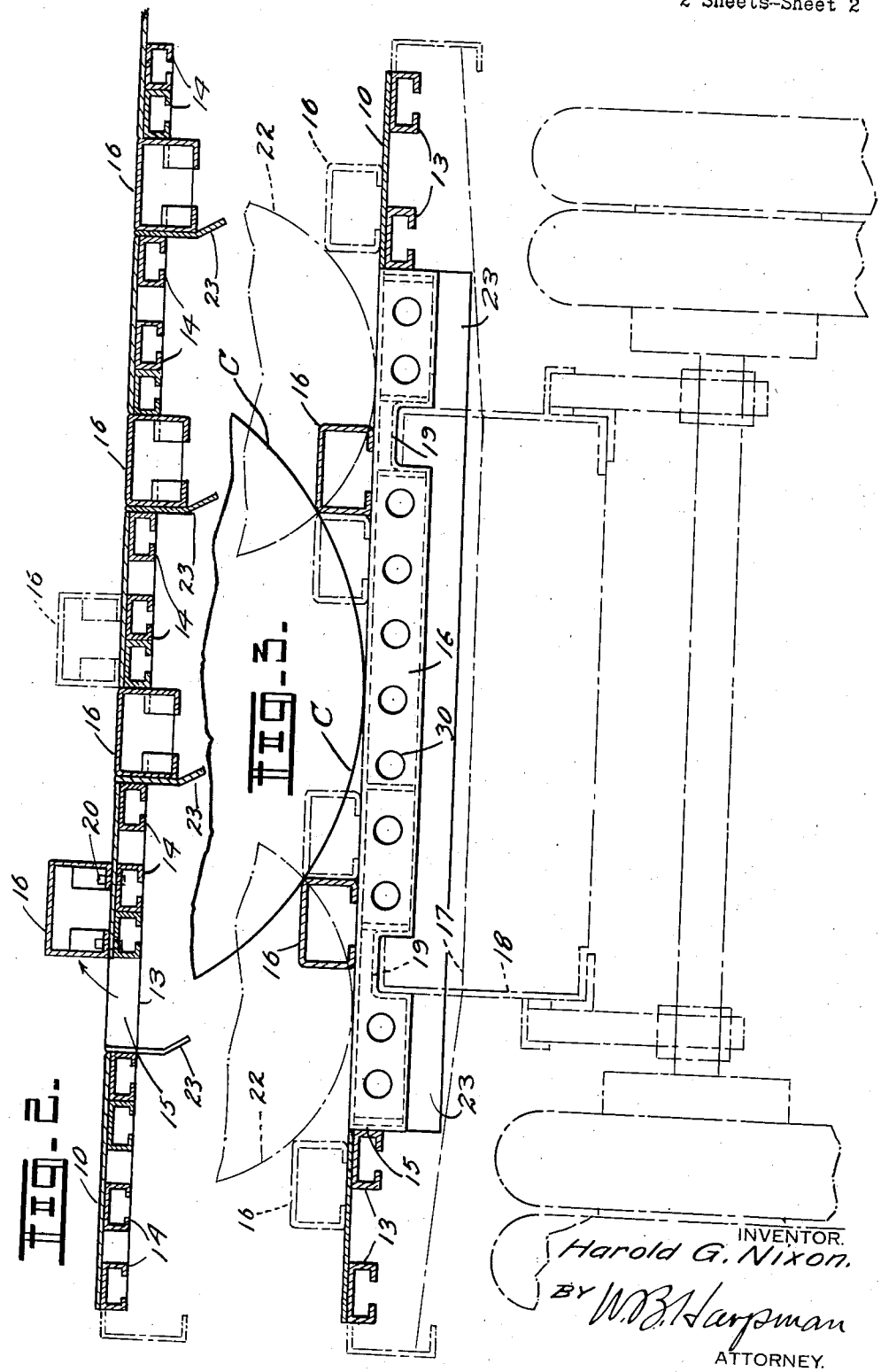
INVENTOR.
Harold G. Nixon.
BY W. B. Harpman
ATTORNEY.

Patented Jan. 10, 1950

2,494,404

UNITED STATES PATENT OFFICE 2,494,404

TRAILER

Harold G. Nixon, Youngstown, Ohio

Application April 30, 1947, Serial No. 745,079

4 Claims. (Cl. 296—28)

This invention relates to a trailer and more particularly to a trailer adapted for hauling hot steel products.

The principal object of the invention is the provision of a trailer or semi-trailer construction adapted for use in hauling hot steel products and the like.

A further object of the invention is the provision of a trailer or semi-trailer having a deck construction incorporating blocking means for loads positioned thereon.

A still further object of the invention is the provision of a trailer or semi-trailer construction providing ventilating means for cooling heated metal positioned thereon.

A still further object of the invention is the provision of a trailer or semi-trailer construction which may be economically and easily constructed of available materials and which may be used for hauling steel sheets, plates and rolls of strip and the like immediately after their formation and/or processing and while in heated condition.

The trailer construction shown and described herein is adapted for trailer or semi-trailer use such as commonly employed in hauling heavy loads and wherein the trailers or semi-trailers are hauled by conventional highway tractors. It is well known that many and various types of trailer constructions have been proposed and include trailers and semi-trailer constructions for use with tractors to form tractor and semi-trailer combinations for handling heavy freight and the like. It is also known that to date these constructions have employed wooden deck structures primarily to hold the weight of the trailer or semi-trailer to the minimum possible. Trailers and semi-trailers are efficiently used in handling various freight products such as steel and the like with the exception that hot steel, as it is received directly from a mill, cannot be hauled thereon. A great deal of the hot steel products so produced are placed directly in steel railway cars for transportation. One of the objects of this invention is to provide a trailer or semi-trailer construction which may be used in handling hot steel products directly from the mill and which will haul the products efficiently and at the same time impart a cooling action thereto all without damage to the trailer or semi-trailer employed.

The several objects of the invention are believed to be met in the provision of a trailer or semi-trailer of conventional frame design and having a novel, lightweight metal deck incorporating blocking members as a part thereof which may be removed and employed in various positions on the deck for blocking loads thereon. The construction also provides for useful deflection of air currents over the load to expedite the cooling of hot materials hauled on the trailer or semi-trailer so formed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 2 is a horizontal cross section taken on line 2—2 of Figure 1.

Figure 3 is a horizontal cross section taken on line 3—3 of Figure 1.

Figure 1:
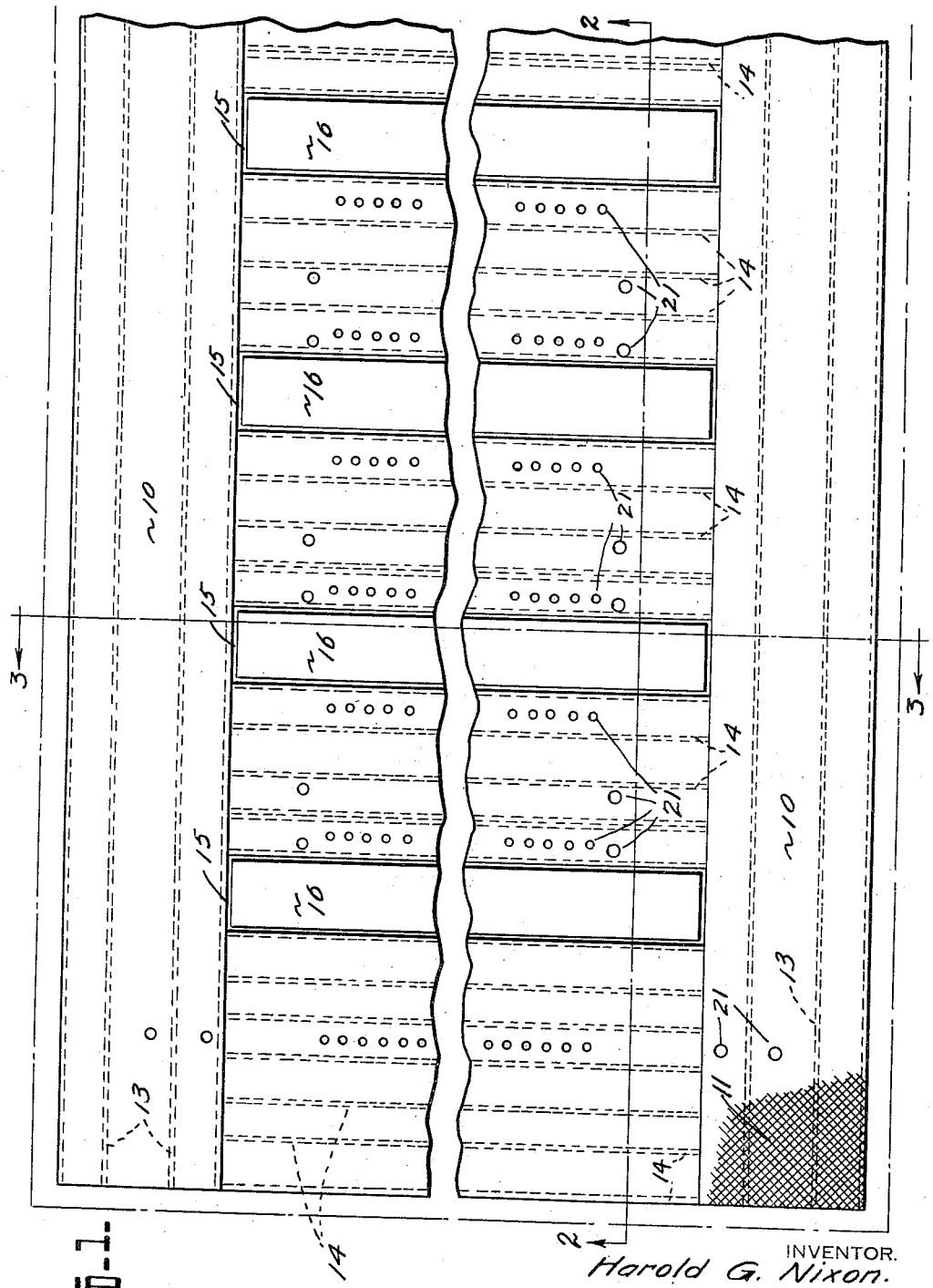
Figure 1 is a top plan view of a portion of a trailer or semi-trailer with parts broken away and illustrating the positioning of the removable, interchangeable blocking means and ventilating means.

By referring to the drawings and Figures 1, 2 and 3 in particular it will be seen that a trailer or semi-trailer construction has been disclosed which includes an upper deck 10 preferably formed of lightweight metal and preferably embossed or otherwise treated on its uppermost surface to provide a non-skid surface such as indicated by the numeral 11. The deck 10 is supported by a plurality of longitudinally extending channels 13 forming the side areas of the deck and a plurality of transversely extending channels 14 underlying the center section of the deck. The longitudinal channels 13 run the full length of the trailer or semi-trailer as shown by the dotted lines underlying the deck plates 10 in Figure 1 and the transversely positioned channels underlying the center section of the deck 10 occupy the area between the two spaced side sections defined by the longitudinally extending channels 13.

As best shown in Figure 2 of the drawings a plurality of the channels 14 are positioned in suitable supporting arrangement to a section of deck 10 and form a unit preferably welded, riveted or otherwise affixed to one another and the several units of the trailer construction being spaced with respect to one another so as to define a plurality of transversely positioned openings 15 which extend across the majority of the width of the trailer as illustrated in Figures 1 and 3 and provide areas in which removable blocking members 16 may be positioned when a flat surfaced deck is desired. The plurality of longitudinal channels 13 and the transverse channels 14 are affixed in position on appropriate framing members such as shown in broken lines in Figure 3 and indicated by the numerals 17 and 18.

The transverse openings 15 in which the removable blocking members 16 may be positioned are located between the several framing members 17 and the blocking members 16 are slotted as at 19, as shown in Figure 3, to register with the upper edges of the framing members 18 of the trailer which are longitudinally disposed in accordance with customary trailer and semi-trailer constructions.

The load supporting deck of the trailer or semi-trailer construction as disclosed herein is therefore composed of the main longitudinal framing members 18, the transversely positioned and spaced framing members 17 and the plurality of longitudinally extending channels 13 positioned adjacent the outermost ends of the framing members 17 and the transversely positioned channels 14 which are arranged in units as heretofore disclosed, which units are spaced by the plurality of transverse openings 15.

The novelty in the formation therefore resides in the arrangement and formation of the channel members 13 and 14 and the deck plates 10 carried on their uppermost surface and the blocking members 16 which are removably positioned in the openings 15 in the deck to form a smooth unbroken deck surface or positioned on the deck 10 as in blocking loads, for example, coils of steel, at which time the openings 15 become ventilating means for directing air over the load being carried. When these several parts are formed of lightweight metals, for example, the resulting trailer or semi-trailer construction is of approximately the same weight as the wooden deck trailers and semi-trailers heretofore known in the art.

The construction of the blocking members 16 is such that they may be positioned in a number of alternate positions on the deck 10 and maintained thereon by reason of their being provided with a plurality of studs 20 which are registrable with appropriately positioned openings 21 in the deck plate 10.

By referring now to Figure 3 of the drawings it will be seen that two alternate positionings of the blocking members 16 are shown, one pair of blocking members 16 being shown in solid lines in position longitudinally of the trailer or semi-trailer deck and supporting therebetween a coil of steel C.

An alternate arrangement wherein two parallel rows of smaller coils of steel 22 are positioned is also illustrated in broken lines and wherein the alternate positioning of the blocking members 16 is shown. It will thus be observed that many and various positionings of the blocking members 16 are possible and that in each of the several positions in which they may be positioned the studs 20 engage appropriately formed and located openings 21 in the deck of the trailer.

It will be obvious to those skilled in the art that the blocking members 16 may be positioned transversely of the trailer as shown in Figure 2 in end elevation wherein one of the blocking members 16 is shown in solid lines and the remainder are shown in registry in the openings 15. In order that the openings 15 may be used for directing air for cooling purposes over the load carried on the trailer or semi-trailer constructed in accordance with the disclosure, each of the openings 15 are provided with depending air deflecting fins 23 which are normally inclined from vertical so as to act as an air scoop as, for example, when the trailer, shown in Figure 2, is moving from left to right. Air flowing beneath the trailer deck will, therefore, be deflected upwardly through the openings 15 by the fins 23. When the blocking members 16 are positioned in the openings 15, the fins 23 serve as tensioning members to hold the blocking firmly in position therein. No other means of support is necessary as the blocking members are notched out, as clearly shown in Figure 3, where they overlie the upper edges of the main frame 18, the notches having been heretofore referred to and indicated by the numerals 19.

It will thus be seen that a simple and efficient trailer or semi-trailer construction has been disclosed which, when formed of lightweight metals, for example, is capable of supporting unusually heavy loads and at the same time provides for the necessary blocking by making available portions of the trailer structure as blocking members. In addition, the removal of the blocking members from their normal positions in the trailer deck creates air deflecting means which is highly desirable for cooling certain materials such as stacks or coils of steel which may be loaded on the trailer directly from the mill and will obviously be of relatively high temperature. The provision of the trailer or semi-trailer construction disclosed herein makes possible the use of truck and trailer or tractor and semi-trailer combinations for use in hauling steel heretofore incapable of being transported by such means. Therefore, the invention contributes substantially to the welfare of the trucking industry as well as the steel producing industry as more efficient, less expensive transportation is available for the hot finished steel products.

It will be obvious to those skilled in the art that the transverse arrangement of the main or center section of the trailer or semi-trailer disclosed herein may be altered to longitudinal, if desired, thereby causing the openings 15 to run longitudinally of the trailer rather than transversely as illustrated and heretofore described.

Having thus described my invention, what I claim is:

1. A vehicle deck construction including main framing members and a plurality of deck framing members comprising inverted channels, said deck framing channels lying longitudinally of the said deck adjacent the sides thereof and lying transversely of the said deck intermediate of the said longitudinally positioned channels, the said transversely positioned channels spaced to form a plurality of transverse openings and secondary channel members removably positioned in the said openings and carried on the said framing members and alternately usable as load blocking members on the deck of the said trailer.

2. A vehicle deck construction comprising a plurality of channels, deck plates carried on the said channels, the said channels and deck plates arranged to form spaced slot-like ventilating openings in the deck, blocking members removably positioned in the said slot-like ventilating openings normally forming continuations of the trailer deck construction and usable as load blocking members when moved to position on the said deck, air deflectors affixed to the said channels adjacent the said ventilating openings to direct air currents upwardly therethrough.

3. A truck deck construction including longitudinal and transverse framing members and a load bearing deck formed of a plurality of inverted channels arranged to define slot-like openings in said deck, secondary channels removably positioned in the said slot-like openings forming continuations of the deck area when located in the said openings and usable as load blocking members when positioned on the said deck, air deflectors affixed to the said channels adjacent the said openings to direct air currents upwardly therethrough.

4. A vehicle deck construction including main framing members and a plurality of deck framing members, said deck framing members lying longitudinally of the said deck adjacent the sides thereof and lying transversely of the said deck intermediate of the said longitudinally positioned members, the said transversely positioned members spaced to form a plurality of transverse ventilating openings in said deck and blocking members removably positioned in the said ventilating openings and carried on the said framing members of the deck and usable as load blocking members on the said deck, and deck plates bridging the said framing members to form a load bearing deck, air deflectors affixed to the said framing members adjacent the said openings to direct air currents upwardly therethrough.

HAROLD G. NIXON.

REFERENCES CITED

The following references are of record in the file of this patent:

UNITED STATES PATENTS

| Number | Name | Date |
|---|---|---|
| 713,748 | Carnahan | Nov. 18, 1902 |
| 986,422 | Bettendorf | Mar. 7, 1911 |
| 1,082,584 | Clippinger | Dec. 30, 1913 |
| 1,531,932 | Haun | Mar. 31, 1925 |
| 2,107,853 | Coffey | Feb. 8, 1938 |
| 2,450,204 | Pridy | Sept. 28, 1948 |

FOREIGN PATENTS

| Number | Country | Date |
|---|---|---|
| 516,661 | Great Britain | Jan. 8, 1940 |